May 3, 1966   R. W. SELLECK   3,248,797
ELEVATION MEASURING INSTRUMENT
Filed Sept. 9, 1963   2 Sheets-Sheet 1
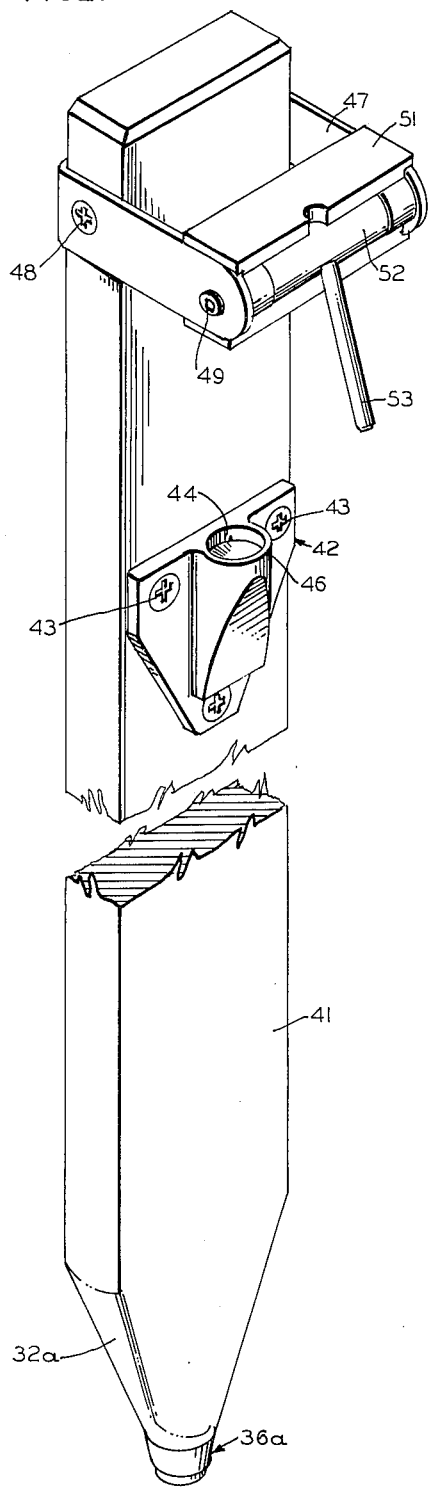
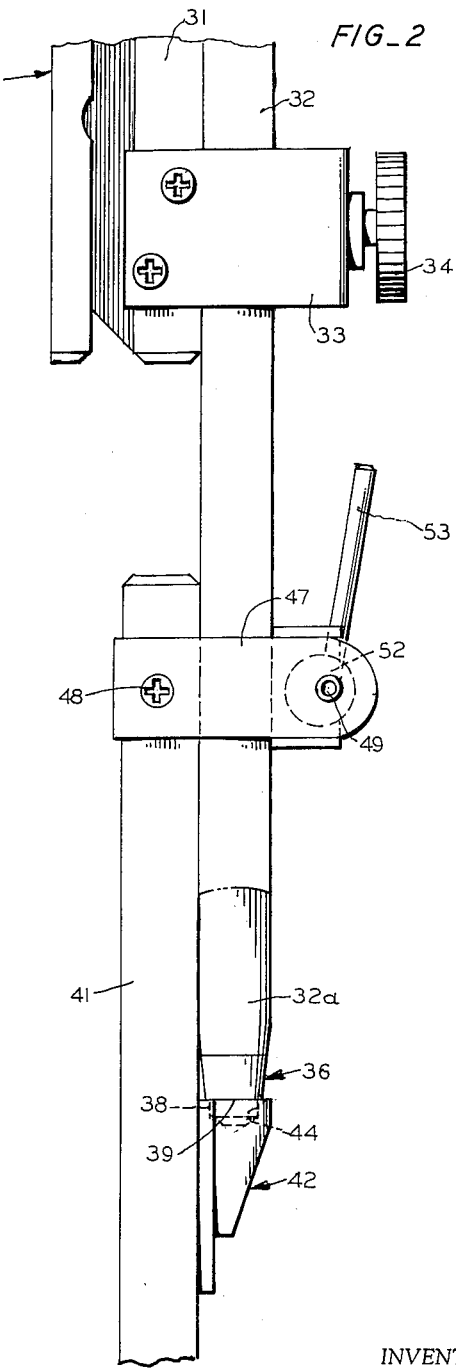
INVENTOR.
ROBERT W. SELLECK
BY
Allen and Chromy
ATTORNEYS May 3, 1966 R. W. SELLECK 3,248,797
ELEVATION MEASURING INSTRUMENT
Filed Sept. 9, 1963 2 Sheets-Sheet 2
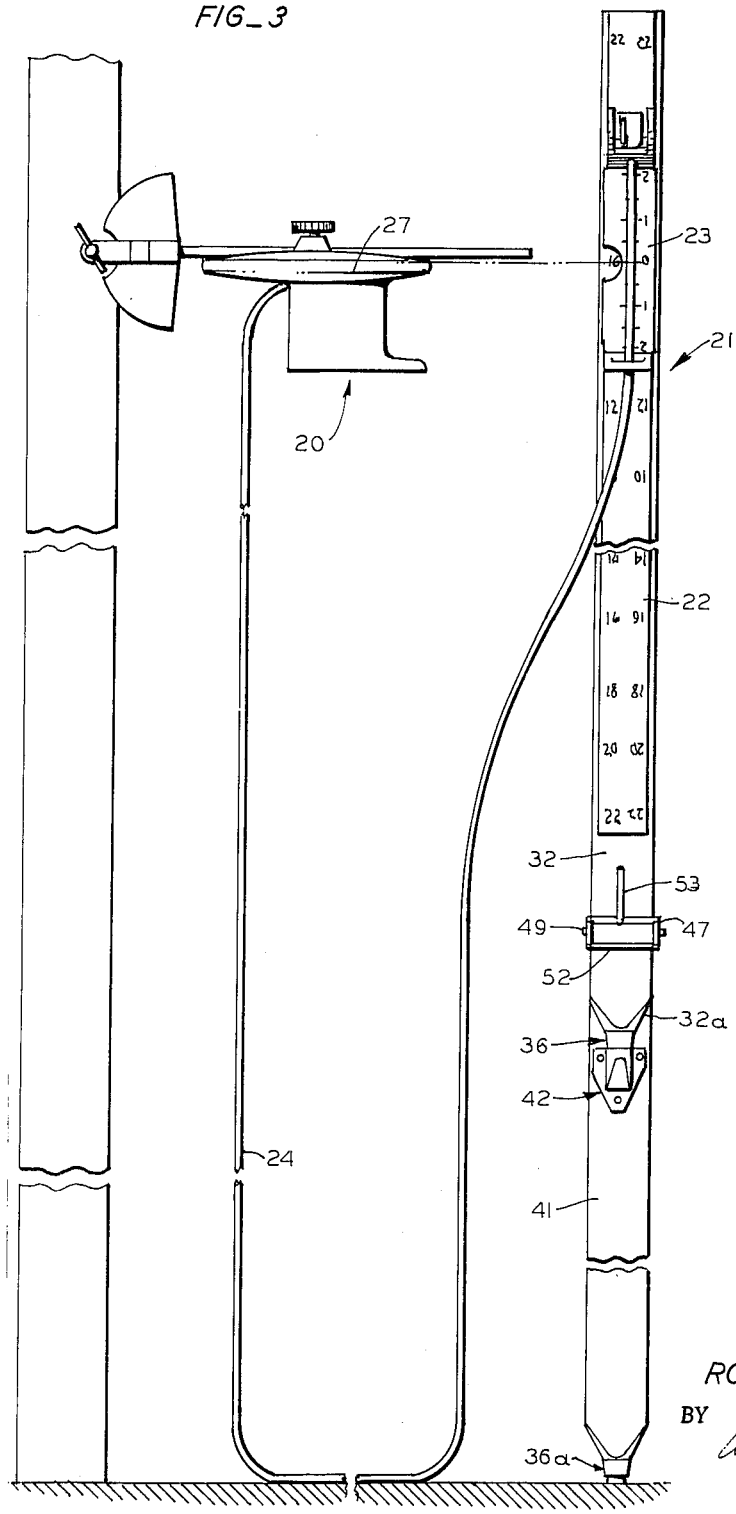
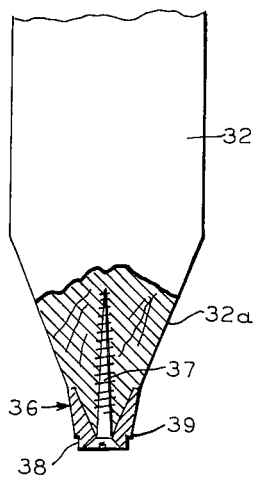
INVENTOR.
ROBERT W. SELLECK
BY
ATTORNEYS

3,248,797
ELEVATION MEASURING INSTRUMENT
Robert W. Selleck, 2952 Senter Road, San Jose, Calif.
Filed Sept. 9, 1963, Ser. No. 307,469
1 Claim. (Cl. 33—169)

The present invention relates to elevation measuring instruments of the liquid level type, and is concerned more particularly with an instrument of this character which is compact in its construction and which can be readily carried from place to place and extended to meet varying heights or depths as the difference of elevation may require.

It is a general object of the invention to provide an improved elevation measuring instrument including a measuring element which has an extensible measuring stick.

A further object of this invention is to provide a measuring stick of the above character in which it is to provide an extension member for a measuring stick which can be quickly installed and removed and easily clamped in place.

Other objects and advantages of the invention will be apparent from the following description of a preferred embodiment thereof, taken in conjunction with the accompanying drawings, in which:

FIG. 1 is a perspective view of the extension member for use with a measuring instrument.

FIG. 2 is a side elevational view of the extension member in place on the measuring stick of the instrument.

FIG. 3 is an elevational view of the measuring instrument.

FIG. 4 is a detail view of one end of the measuring stick or element with the lower part shown in section.

Referring to FIG. 3, the measuring instrument comprises a reference element indicated generally at 20 and a measuring element or stick 21 comprising a stick portion 22 and a scale element 23 slidably and removably mounted on the stick 22. This scale element 23 is connected by a hose 24 to the reservoir element 27 of the reference element 20. This general structure is a type disclosed and claimed in my copending application Serial No. 317,834 filed October 21, 1963.

Referring to FIGS. 2 and 3, the measuring element or stick 21 comprises a pair of telescopically engaged generally rectangular wooden sticks 31 and 32 having U-shaped guides 33 secured to the stick 31 and embracing the stick 32 as shown in FIG. 2 and one of these guides carries a clamping screw 34. Thus the sticks 31 and 32 can be extended or contracted with respect to each other and held in adjusted position. Referring to FIGS. 2, 3 and 4, the lower end of the stick 32 has a tapered or reduced portion 32a which has a cylindrical ferrule 36 secured thereto by a screw 37 and this ferrule is provided with a reduced annular portion 38 at its end providing a shoulder 39 spaced from the extreme end of the stick.

In using the measuring stick in situations requiring a greater length than can be obtained by telescopically extending the sticks 31 and 32, there is provided an extension stick 41 (FIGS. 1, 2 and 3) which is also generally rectangular and similar in shape to the stick 32. This extension stick 41 carries a socket structure 42 secured thereto by a plurality of screws 43 and containing a socket 44 which is complementary in shape to the ferrule 36 and has a top surface 46 adapted to engage the shoulder 39 at the end of the stick when its end is seated in the socket structure 42 as shown for example in FIGS. 2 and 3. At the end of the extension stick 41 there is a ferrule 36a similar to the ferrule 36 at the end of the stick member 32. At the upper end of the extension stick member 41 there is a U-shaped bracket 47 secured thereto by one or more screws 48 having a clamping means pivoted therein about a pivot shaft 49. The clamping structure comprises a U-shaped clamping member 51 rotatably carried by an eccentric 52 having an operating handle 53, the eccentric 52 being mounted about an eccentric axis on the shaft 49. The opposed side walls of the clamping member 51 are extended to overlap the respective arms of the bracket 47 so that the clamping member 51 is maintained slidably in the position shown with the flat surface of the clamping member in position to engage the stick 32 as seen in FIG. 2. By changing the handle 53 from the position shown in FIG. 1 to that shown in FIG. 2, the measuring stick member 32 is securely clamped to the extension stick 41 so that the extension stick provides a fixed added length to the measuring stick as a whole. By providing a plurality of the extension sticks 41, the length of the measuring stick can be increased to measure for example the fall of a sewer which descends abruptly or to measure a difference in elevation down a hillside.

While I have shown and described a preferred embodiment of the invention, it will be apparent that the invention is capable of variation and modification from the form shown so that the scope thereof should be limited only by the scope of the claims appended hereto.

What I claim is:

In an elevation measuring instrument, a measuring element comprising a stick member having an end for engaging a surface to be measured, said end being formed as a reduced extension provided with a shoulder adjacent its base, an extension member for said stick member for detachable connection thereto, a socket structure on said extension member formed complementarily to said end for connection thereto, said socket structure being provided with a surface for engagement with said shoulder and a socket to receive said reduced end, and clamping means on one of said members for clamping engagement with the other of said members to secure said members against relative endwise movement to maintain said end in said socket structure, whereby attachment of said extension member to said stick member adds a measured increment of length thereto.

References Cited by the Examiner
UNITED STATES PATENTS 985,784    3/1911    Dailey _____ 33—74
999,908    8/1911    Tatro _____ 248—35

FOREIGN PATENTS 464,477    1/1914    France.

ISAAC LISANN, *Primary Examiner.*